United States Patent
Ohga

(10) Patent No.: US 6,990,232 B2
(45) Date of Patent: Jan. 24, 2006

(54) IMAGE PROCESSING APPARATUS, CONTROL METHOD THEREOF, AND IMAGE PROCESSING METHOD

(75) Inventor: Manabu Ohga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 09/940,491

(22) Filed: Aug. 29, 2001

(65) Prior Publication Data

US 2002/0024524 A1 Feb. 28, 2002

(30) Foreign Application Priority Data

Aug. 31, 2000 (JP) ........................................ 2000-264293

(51) Int. Cl.
*G06K 9/00* (2006.01)

(52) U.S. Cl. ...................... 382/162; 382/218; 358/523; 358/518; 345/543; 345/531

(58) Field of Classification Search ......... 382/162–167, 382/218; 358/1.9, 504, 518, 523; 345/153, 345/199, 150, 609, 503, 501, 544, 531, 543
See application file for complete search history.

(56) References Cited

U.S. PATENT DOCUMENTS

| | | | | |
|---|---|---|---|---|
| 5,200,832 A | * | 4/1993 | Taniuchi et al. | ............ 358/300 |
| 5,610,997 A | | 3/1997 | Ohta et al. | ................. 328/218 |
| 5,796,864 A | * | 8/1998 | Callahan | ...................... 382/166 |
| 5,809,366 A | * | 9/1998 | Yamakawa et al. | ........... 399/39 |
| 6,075,514 A | | 6/2000 | Ryan | ........................... 345/153 |
| 6,657,631 B1 | * | 12/2003 | Schinnerer | .................. 345/502 |
| 2002/0145611 A1 | * | 10/2002 | Dye et al. | ................... 345/543 |
| 2004/0141193 A1 | * | 7/2004 | Mestha | ....................... 358/1.9 |

FOREIGN PATENT DOCUMENTS

| | | |
|---|---|---|
| JP | 04-052159 | 6/1990 |
| JP | 05-035594 A | 2/1993 |
| JP | 06-282487 A | 10/1994 |
| JP | 10-229495 A | 8/1998 |
| JP | 2000-113172 A | 4/2000 |

OTHER PUBLICATIONS

U.S. Appl. No. 09/947,394, filed Sep. 7, 2001.
U.S. Appl. No. 09/948,604, filed Sep. 10, 2001.

\* cited by examiner

*Primary Examiner*—Kanjibhai Patel
*Assistant Examiner*—Ali Bayat
(74) *Attorney, Agent, or Firm*—Fitzpatrick, Cella, Harper & Scinto

(57) ABSTRACT

Color caching method used in color matching processing has advantages and disadvantages, and the processing efficiency depends upon an image to be processed. In view of this, color matching calculation and caching for uniquely determining an output color corresponding to an input color are employed to calculate a hit rate per unit block at a checkpoint block when performing color matching processing in block unit having a predetermined pixel size. Based on the calculated hit rate, a caching method to be applied to a block subsequent to the checkpoint block is determined.

19 Claims, 11 Drawing Sheets

IMAGE PROCESSING APPARATUS, CONTROL METHOD THEREOF, AND IMAGE PROCESSING METHOD

FIELD OF THE INVENTION

The present invention relates to an image processing apparatus, a control method thereof, and an image processing method, and more particularly, to image processing for performing color conversion such as color matching.

BACKGROUND OF THE INVENTION

In color matching processing, color caching is applicable when an output color is uniquely determined from an input color. Color caching provides a greater effect as matching operation for calculating an output color from an input color becomes more complicated.

In a case where a color matching operation is complicated, the number of times of color matching may be reduced to improve color matching processing speed. However, it may be counterproductive if preprocessing (e.g., an operation for determining whether or not a hit is found in a hash table) is made too complicated.

Caching includes two methods: a method where values for a plurality of pixels already processed are cached for reference (hereinafter referred to as a plural pixel caching method), and a method where a value for an immediately preceding pixel is cached for reference (hereinafter referred to as a single pixel caching method). The plural pixel caching method has a higher hit rate compared to the single pixel caching method. However, in a case of an image having a low hit rate such as a photograph image, the single pixel caching method may sometimes achieve a better processing efficiency as a whole. This reverse phenomenon occurs because a low hit rate generates an overhead in preprocessing that cannot be neglected. Furthermore, when a hit rate is extremely low, sometimes it is better not to use caching. Characteristics of each color caching method are described below.

Single Pixel Caching Method

A high hit rate is expected for a background image or an image having a large proportion of a solidly filled area, whereas a low hit rate is obtained for a gradation area or a photograph image. Since preprocessing is simple, an overhead is relatively low even in the case of a low hit rate.

Plural Pixel Caching Method

A higher hit rate is achieved compared to the single pixel caching method. High efficiency is expected when the number of colors in an image is lower than the number of entries registrable in a hash table, but low efficiency is obtained when collisions frequently occur in a hash table. Since preprocessing is complicated, an overhead is generated for an image having a low hit rate such as a photograph image.

Each caching method has advantages and disadvantages as described above, and processing efficiency depends upon an image subjected to processing. The image subjected to processing includes an image scanned by a scanner (e.g., a photograph image), an image obtained by rendering 3DCG (three-dimensional computer graphics), an image obtained by rasterising a vector image and so on, and the number of colors included in these images varies.

Furthermore, along with the high quality trend in the recent image input apparatuses, there are more opportunities of handling photograph images having a large image size. As a result, the single pixel caching method, which has been considered to produce a relatively low overhead, has an accumulated preprocessing time that cannot be neglected.

SUMMARY OF THE INVENTION

The present invention has been proposed to solve each or all of the aforementioned problems, and has as its object to dynamically control the caching method in accordance with an image subjected to processing.

To achieve the above object, a preferred embodiment of the present invention provides an image processing apparatus, comprising: a calculator arranged to calculate an output color corresponding to an input color; a cache memory arranged to cache a calculation result of the calculator in order to uniquely determine an output color corresponding to an input color; a converter arranged to convert an input color to an output color in predetermined processing unit, by utilizing the calculator and cache; and a controller arranged to control a caching method to be applied to a subsequent processing unit based on a cache hit rate per the processing unit.

Furthermore, another object of the present invention is to dynamically control the caching method in accordance with an image subjected to processing, and to control an application area of the caching method.

To achieve the above object, a preferred embodiment of the present invention provides an image processing method comprising the steps of: converting an input color to an output color in predetermined processing unit by calculating an output color corresponding to an input color and utilizing caching arranged to uniquely determine an output color corresponding to an input color; and controlling a caching method to be applied to a subsequent processing unit based on a cache hit rate per the processing unit. Moreover, it is preferable that the image processing method further comprises the step of controlling an application area of the caching method based on the cache hit rate.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Overview of Color Caching

Figure 1:
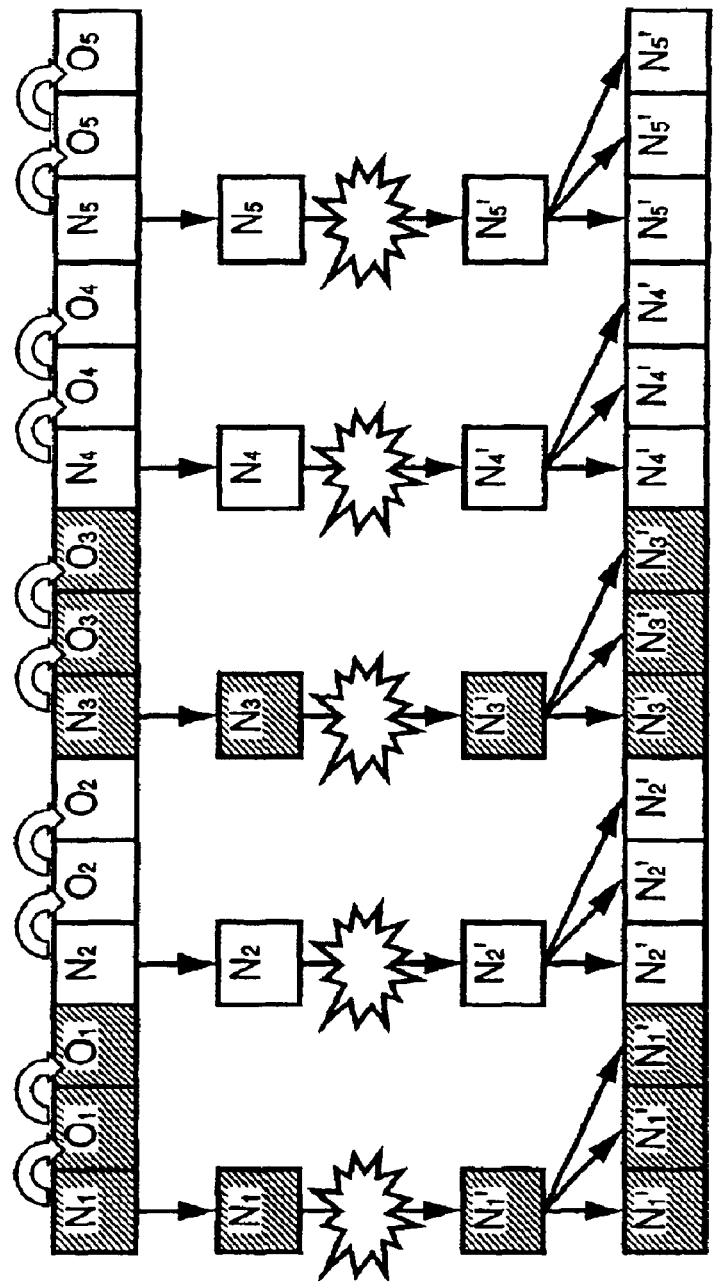
FIGS. 1 and 2 are views explaining color caching.
Figure 2:
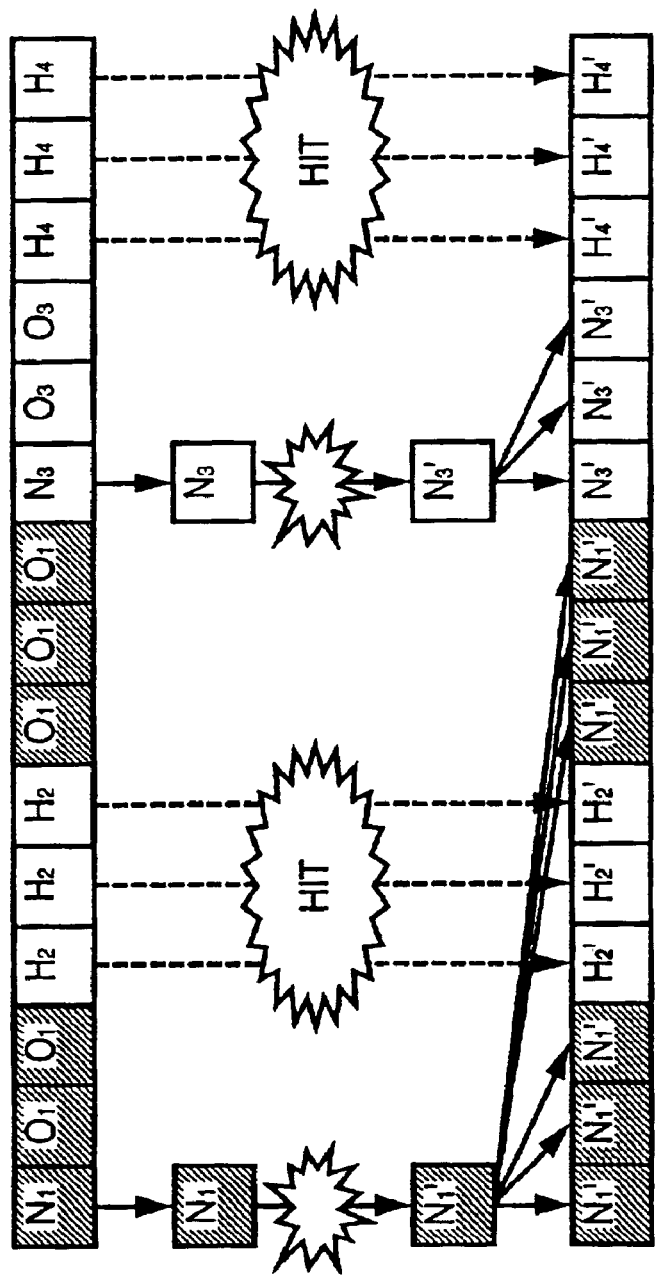

FIGS. 1 and 2 are views explaining color caching. FIG. 1 corresponds to the single pixel caching method, and FIG. 2 corresponds to the plural pixel caching method. In each of the drawings, the upper row indicates input colors and the lower row indicates output colors. Reference letter N denotes a flag indicating an input pixel different from an immediately preceding pixel value; reference letter O, a flag indicating an input pixel coincident with an immediately preceding pixel value; and reference letter H, a flag indicating a hit in a hash table. Matching is performed on a pixel having flag N. To obtain a matching result O' of a pixel having flag O, a matching result N' of a pixel having flag N is copied.

Figure 3:
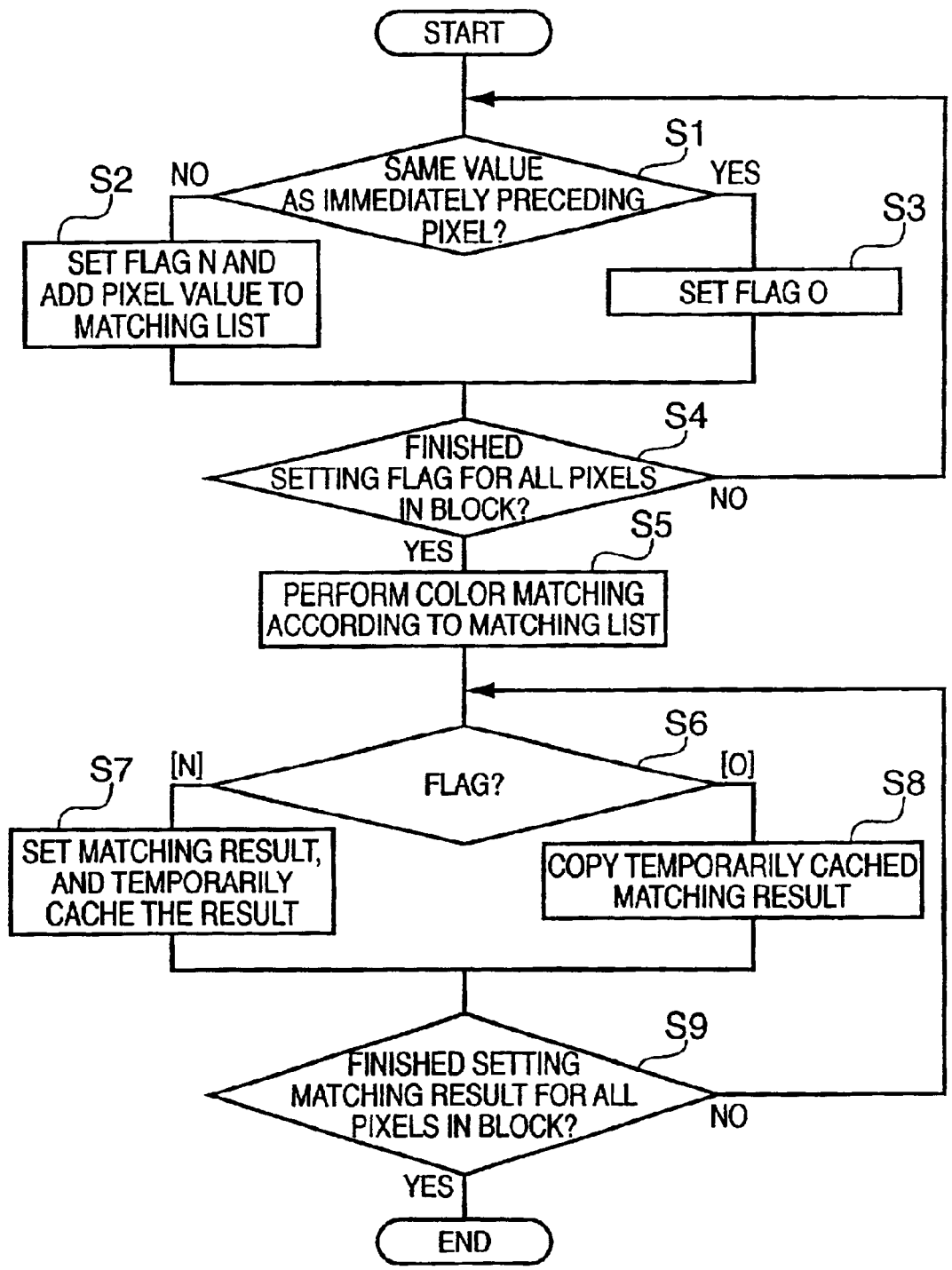
FIGS. 3 and 4 are flowcharts describing color matching processing corresponding to FIGS. 1 and 2 respectively.
Figure 4:
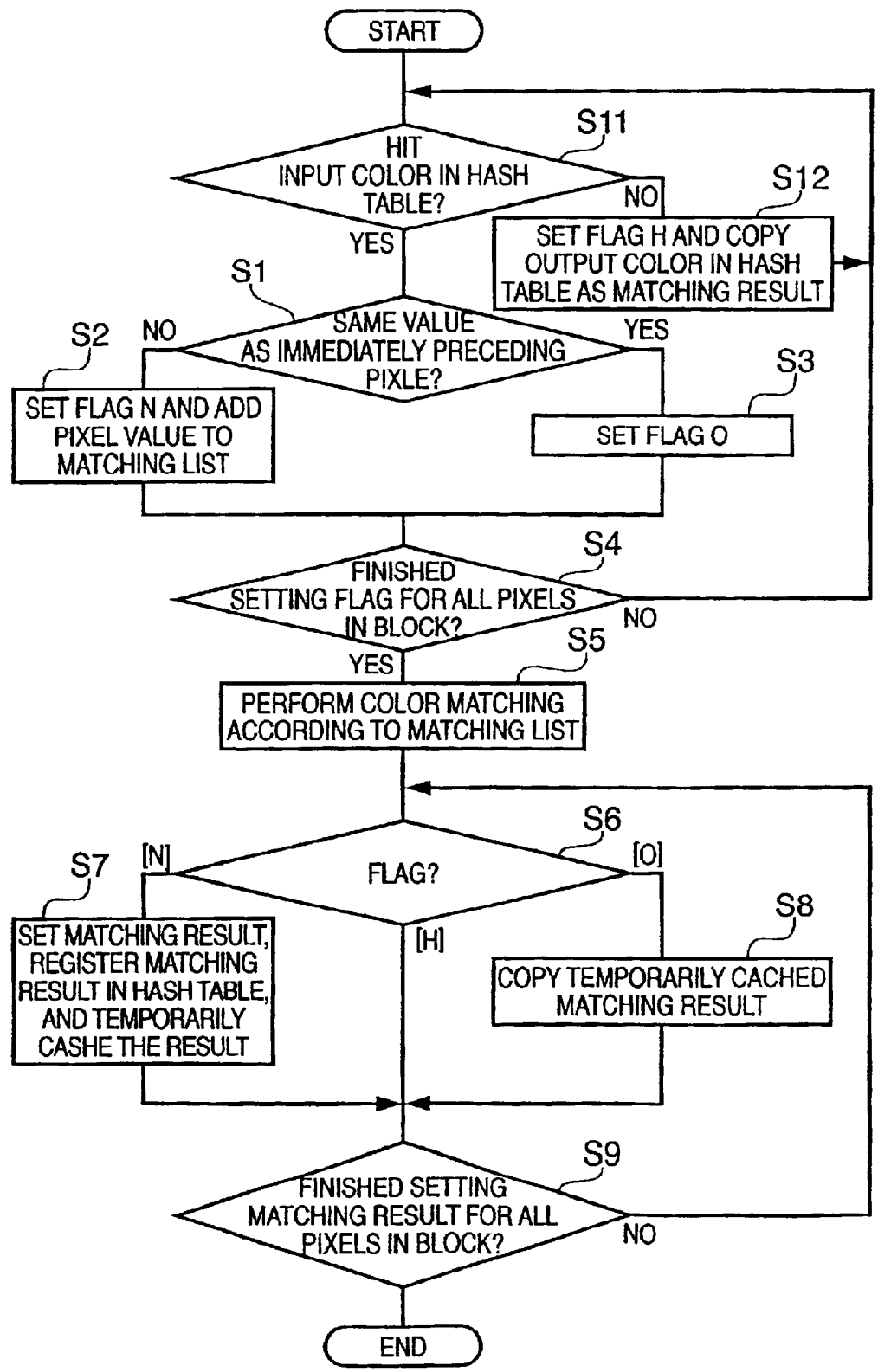

FIGS. 3 and 4 are flowcharts describing color matching processing corresponding to FIGS. 1 and 2 respectively. The flowcharts show processing for a block, which is a unit of color matching processing. Note that identical reference numerals are assigned to processing common in FIGS. 3 and 4.

First, to set a flag in a pixel of the block, which is a unit of color matching processing, pixels in the block are examined in a predetermined order (S1). For a pixel having a different value from an immediately preceding pixel, flag N is set, and the pixel value is added to a matching list (S2). For a pixel having the same value as an immediately preceding pixel, flag O is set (S3).

When it is determined at step S4 that a flag is set in all pixels in the block, color matching is performed on the pixel values registered in the matching list (S5).

Next, the flag is determined at step S6 to set a matching result in the pixel in the block. For a pixel having flag N, the matching result is set and the result is temporarily cached (S7). For a pixel having flag O, a matching result temporarily cached is copied (S8).

When it is determined at step S9 that matching results are set in all pixels in the block, the color matching processing ends.

In the processing shown in FIG. 4, in order to utilize a hash table storing in pairs an input color and an output color already processed (matching result), a value of a pixel is evaluated with a hash function to determine whether or not the value hits a registered value (input value) in a hash table (S11). If a hit is found, flag H is set for the pixel, and a registered value (output color) in the hash table is copied as the matching result (S12).

In the stage of setting a matching result, processing is skipped for a pixel whose flag has been determined at step S6 and where flag H has been set (matching result is set at step S12) (S13). For a pixel having flag N, the matching result is set, registered in the hash table, and temporarily cached (S14).

<First Embodiment>

Figure 5:
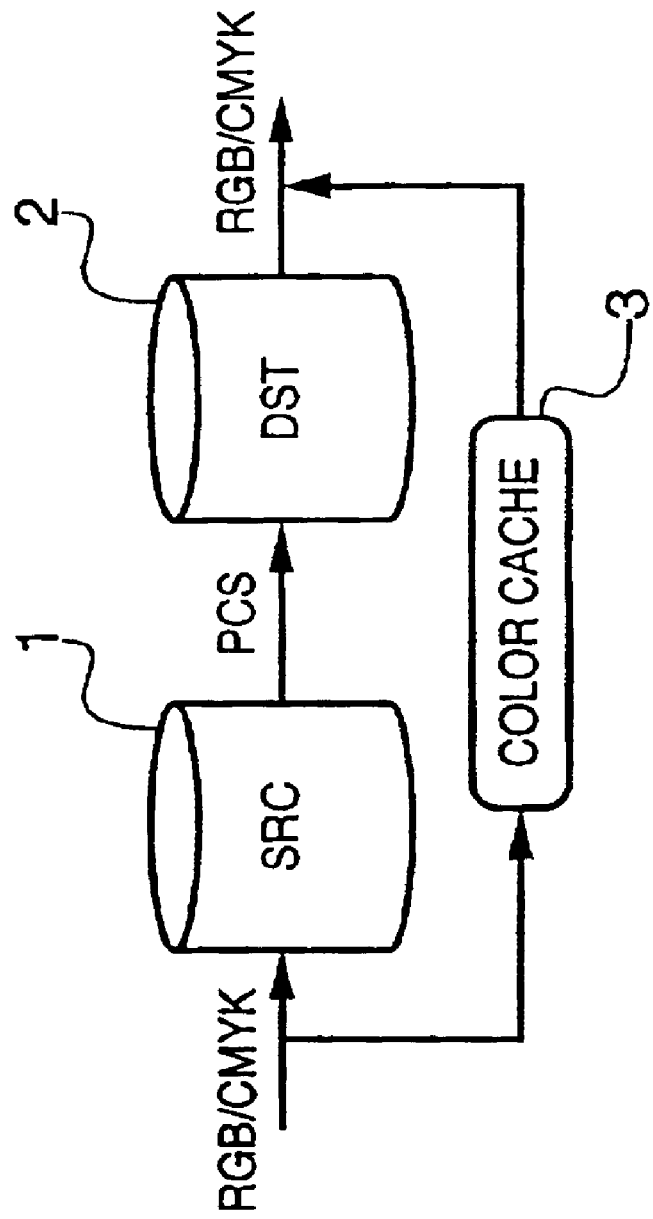
FIGS. 5 and 6 are views showing a basic construction of an embodiment of the present invention.
Figure 6:
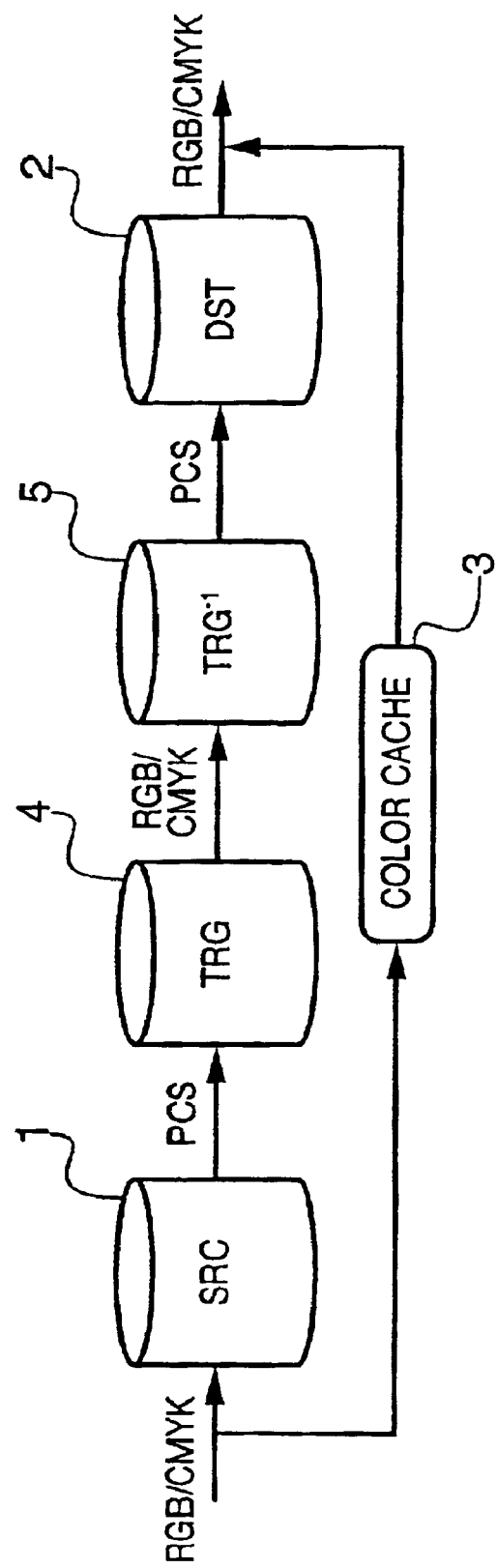

FIGS. 5 and 6 are views showing a basic construction of an embodiment of the present invention, which is employed in a color matching module (CMM) or a system for performing color matching by utilizing ICC (International Color Consortium) profile or the like.

In FIG. 5, RGB or CMYK image data which depends upon a color space of an input device is converted to data (XYZ value or Lab value based on the D50 reference) in a color space (PCS: Profile Connection Space) associating profiles by using an input profile (SRC) 1, and then converted by an output profile (DST) 2 to RGB or CMYK image data which depends upon a color space of an output device. Color caching according to the first embodiment, using a color cache 3, is employed in this conversion.

In FIG. 6, RGB or CMYK image data which depends upon a color space of an input device is converted to data (XYZ value or Lab value based on the D50 reference) in a color space (PCS: Profile Connection Space) associating profiles by using the input profile (SRC) 1, and further converted by a profile (TRG) 4 to RGB or CMYK data in a specific color space. Then, the RGB or CMYK data is converted back to PCS data by a profile (TRG$^{-1}$) 5, and then converted to RGB or CMYK image data which depends upon a color space of an output device by the output profile (DST) 2. Color caching according to the first embodiment, using the color cache 3, is employed in this conversion.

Note that the first embodiment of the present invention is applicable to processing other than color matching, in which an output color is uniquely determined from an input color, such as a case where an output color corresponding to an input color is stored in a color cache, and the cached output color is outputted when the same input color is inputted in the subsequent processing.

Figure 7B:
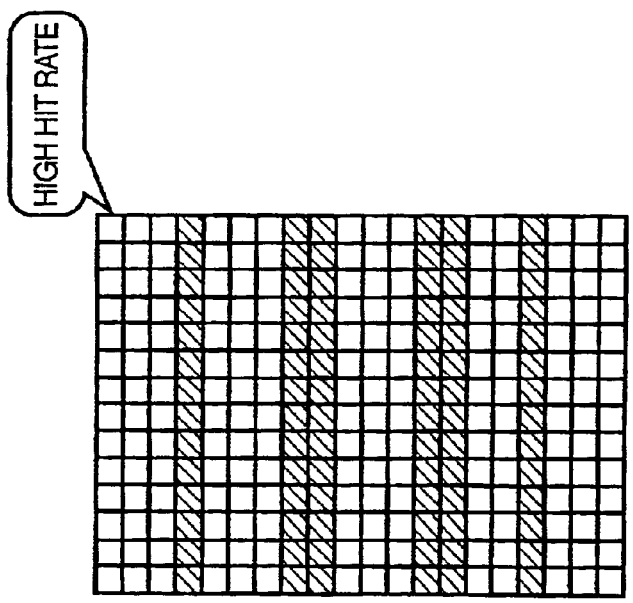
FIGS. 7A and 7B are views explaining a concept of the color caching according to the embodiment.
Figure 7A:
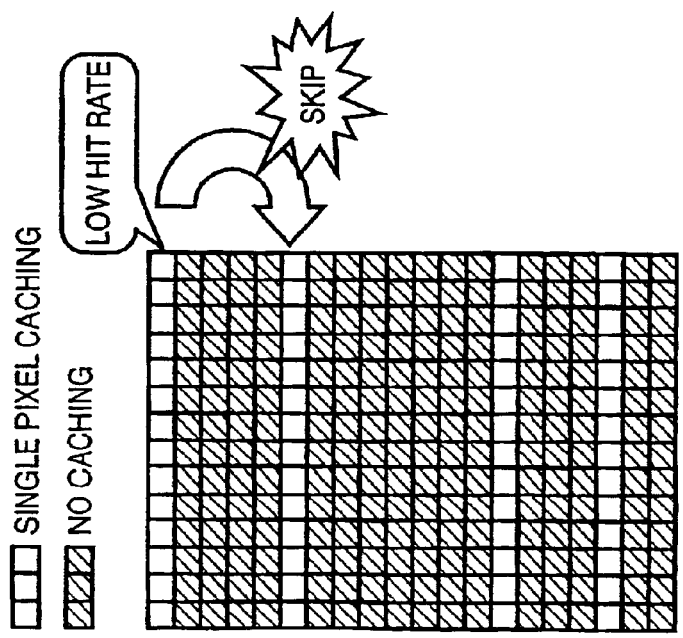

FIGS. 7A and 7B are views explaining the concept of the color caching according to the embodiment.

An image of interest is subjected to matching processing in block unit, and at a checkpoint block, a hit rate per unit block is calculated. According to the hit rate per unit block, a caching method to be applied to the block subsequent to the checkpoint is decided.

For instance, as shown in FIG. 7A, when the hit rate per unit block is low, the subsequent predetermined number of blocks are processed with "no caching" (hereinafter this will be expressed as "caching is skipped"). On the other hand, as shown in FIG. 7B, when the hit rate per unit block is high, the subsequent predetermined number of blocks are processed "with caching". In this manner, caching is skipped for an image, such as a photograph image, in which a low hit rate is predicted, while caching is effectively utilized for an image, such as a CG image, in which a high hit rate is predicted.

Furthermore, the number of blocks to be skipped is controlled in accordance with the hit rate per unit block so as to perform most appropriate color caching on the image of interest. More specifically, for a photograph image or the like in which a low hit rate per unit block is predicted, a large skipping width is set, thereby enabling to reduce an overhead in preprocessing for determining whether or not a value of an input pixel hits. Meanwhile, for a CG image or the like in which a high hit rate per unit block is predicted, a small skipping width is set given that caching is skipped. Therefore, caching can be effectively utilized.

The size of the aforementioned block can be set freely, to a fixed number of pixels, or the number of pixels in a scan line, or the number of pixels dependent upon resolution or the like. Note in the following description, the size of the block is set to a fixed number of pixels (1024 pixels/block).

[Switching Control Between Single Caching Method and No Caching]

Figure 8:
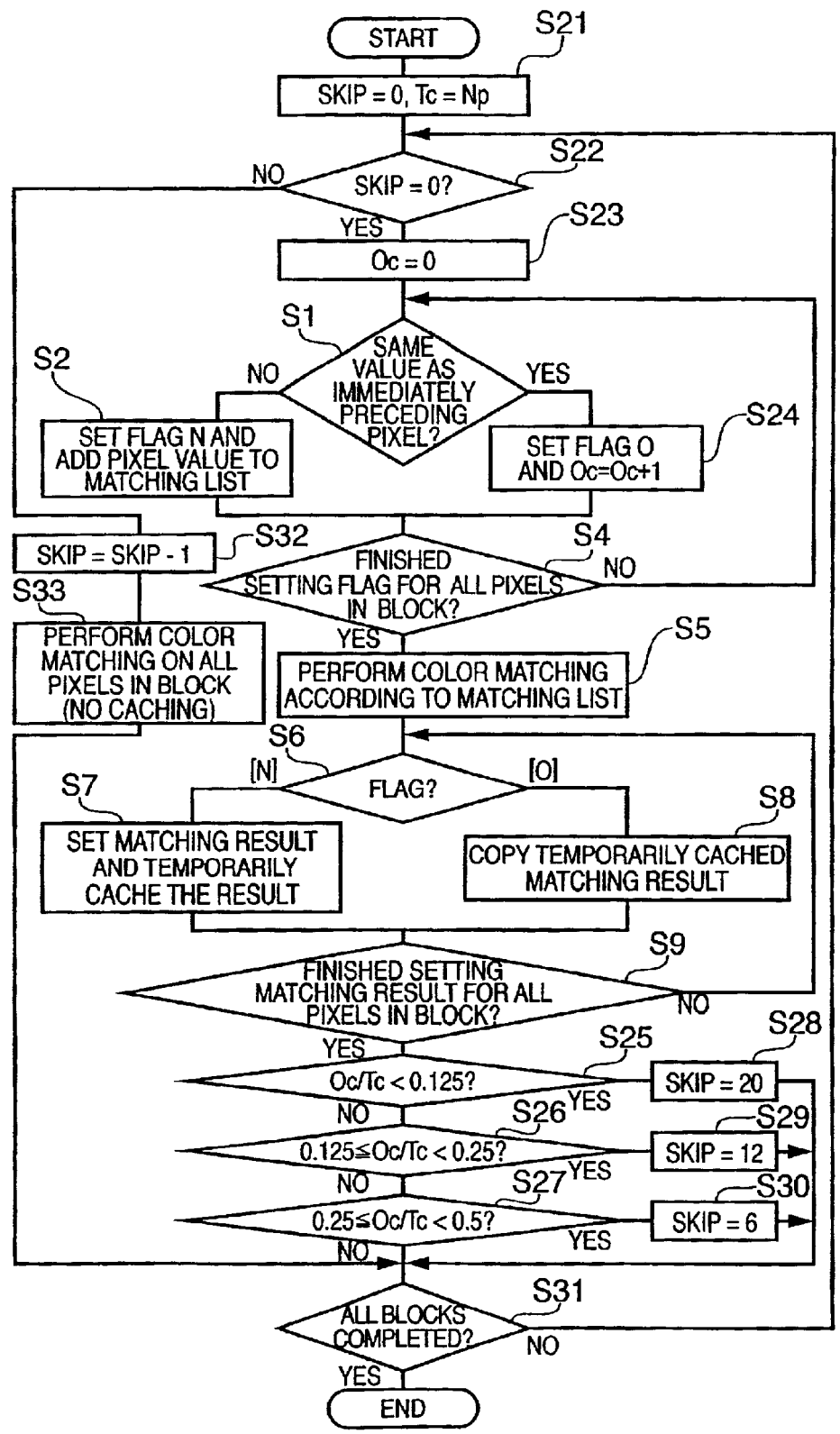
FIG. 8 is a flowchart explaining the control of switching between the single pixel caching method and no caching.

FIG. 8 is a flowchart explaining the control of switching between the single pixel caching method and no caching. In this case, color matching processing according to the single pixel caching method is performed at least at a checkpoint block. Note in FIG. 8, steps performing the same processing as that of FIG. 3 are described with the same reference numerals, and detailed description thereof is omitted.

When color matching processing starts, a variable SKIP is cleared to 0 at step S21, and the number of pixels Np in the block (1024 in this case) is set to the variable Tc. At step S22, it is determined whether or not the variable SKIP is 0.

When SKIP=0, color matching processing is performed by the single pixel caching method. This processing is mostly the same as that explained in FIG. 3, except that the variable Oc is cleared to 0 (S23) and the variable Oc is incremented when flag O is set (S24). In other words, the variable Oc represents the number of hits in the cache.

When a matching result is set to all pixels in the block, the hit rate (Oc/Tc) is evaluated at steps S25 to S27. When Oc/Tc<0.125 stands, SKIP=20 (S28) is set; when 0.125≦Oc/Tc<0.25 stands, SKIP=12 (S29) is set; and when 0.25≦Oc/Tc<0.5 stands, SKIP=6 (S30) is set. When Oc/Tc is equal to or larger than 0.5, caching is not skipped; thus SKIP=0 does not change.

Next, it is determined whether or not processing has been completed for all blocks of an image of interest (S31). If not, the control returns to step S22, otherwise the color matching processing ends.

When SKIP>0 stands at step S22, the variable SKIP is decremented (S32), then color matching is performed on all pixels in the block with no caching, and the control proceeds to step S31.

As described above, dividing the number of hits Oc by the number of pixels Tc (=1024) in the block obtains a hit rate per block (Oc/Tc). The number of blocks to be skipped is controlled in accordance with the obtained hit rate, thereby optimizing the color matching speed for an image of interest. Note that the aforementioned configurations and parameters for cache switching control, e.g., the threshold values shown in steps S25 to S30, the number of skips, and the level of skip numbers and so forth, are an example. These values vary depending upon the capability of color matching processing mentioned below.

preprocessing time per pixel
   matching processing time per pixel
   characteristics of an image of interest (rasterized image where plural images are pasted, photograph image, CG and so on)
   size of an image of interest Furthermore, it is preferable to limit the number of blocks to be skipped taking into consideration of a partial color variation in an image. In view of this, to provide switching control for a general-purpose cache, it is necessary to vary the cache switch control parameters and configurations in the actual color matching environment and analyze the processing speed with a variety of images.

[Switching Control Between Plural Caching Method and No Caching]

Figure 9:
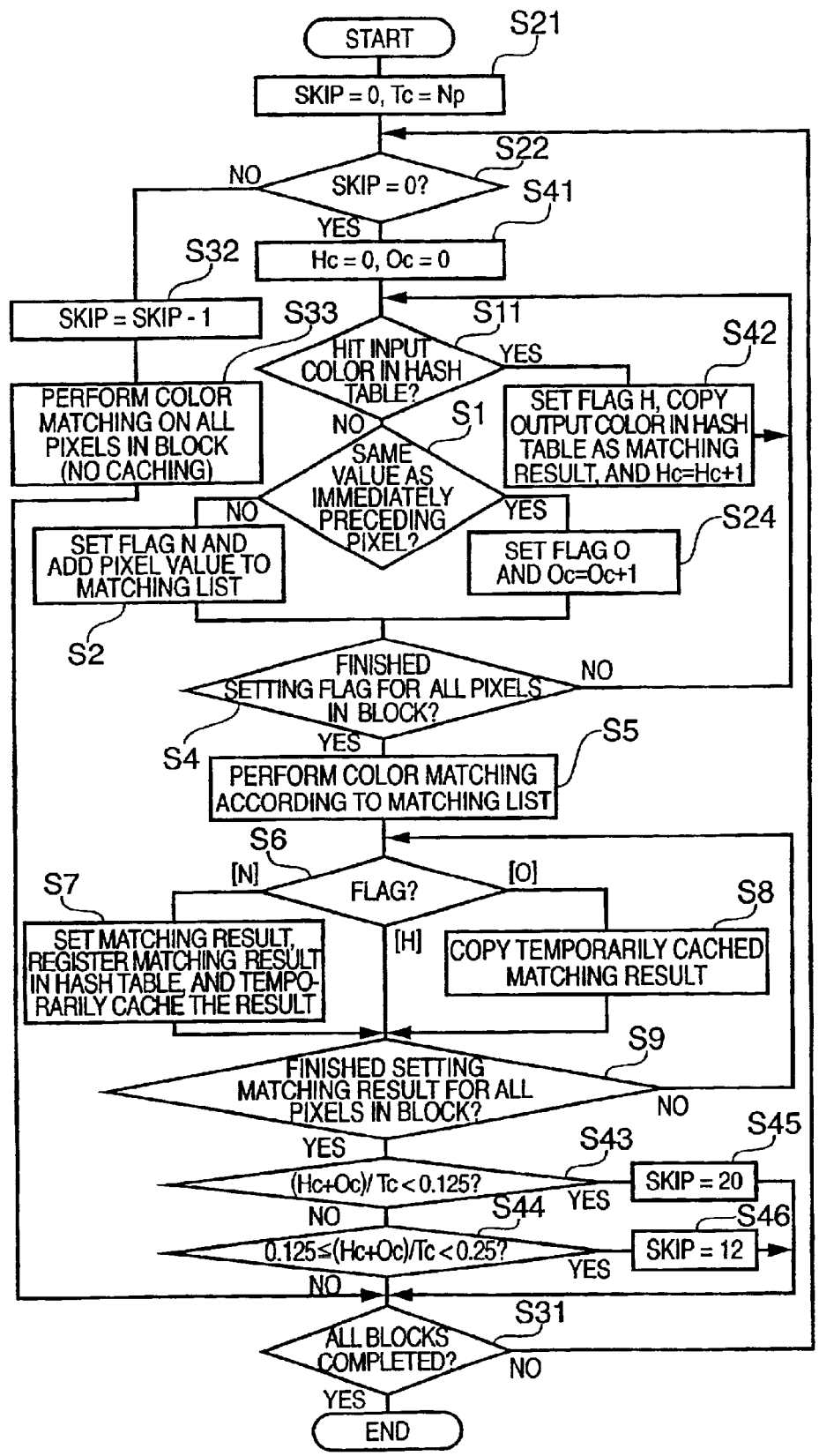
FIG. 9 is a flowchart explaining the control of switching between the plural pixel caching method and no caching.

FIG. 9 is a flowchart explaining the control of switching between the plural pixel caching method and no caching. In this case, color matching processing according to the plural pixel caching method is performed at least at a checkpoint block. Note in FIG. 9, steps performing the same processing as that of FIG. 3, 4 or 8 are described with the same reference numerals, and detailed description thereof is omitted.

When SKIP=0, color matching processing is performed by the plural pixel caching method. This processing is mostly the same as that explained in FIG. 4, except that the variables Hc and Oc are cleared to 0 (S41), the variable Hc is incremented when a hit is found in a hash table (S42), and the variable Oc is incremented when flag O is set (S24). In other words, the variable Hc represents the number of hits in the hash table and Oc represents the number of hits in the cache.

When a matching result is set to all pixels in the block, the hit rate ((Hc+Oc)/Tc) is evaluated at steps S43 to S44. When (Hc+Oc)/Tc<0.125 stands, SKIP=20 (S45) is set; and when 0.125≦(Hc+Oc)/Tc<0.25 stands, SKIP=12 (S46) is set. When (Hc+Oc)/Tc is equal to or larger than 0.25, caching is not skipped; thus SKIP=0 does not change.

As described above, dividing the number of hits Hc+Oc by the number of pixels Tc (=1024) in the block obtains a hit rate per block ((Hc+Oc)/Tc). The number of blocks to be skipped is controlled in accordance with the obtained hit rate, thereby optimizing the color matching processing speed for an image of interest. Similar to the case of single caching method, the aforementioned configurations and parameters for cache switching control, e.g., the threshold values shown in steps S43 to S46, the number of skips, and the level of skip numbers and so forth, are an example, and vary depending upon the capability of color matching processing.

<Second Embodiment>

Hereinafter, an image processing apparatus according to a second embodiment of the present invention is described. Note in the second embodiment, constructions identical to that of the first embodiment are described with the same reference numerals, and detailed description thereof is omitted.

The control of switching among the plural pixel caching method, single pixel caching method, and no caching is described as the second embodiment.

Figure 10:
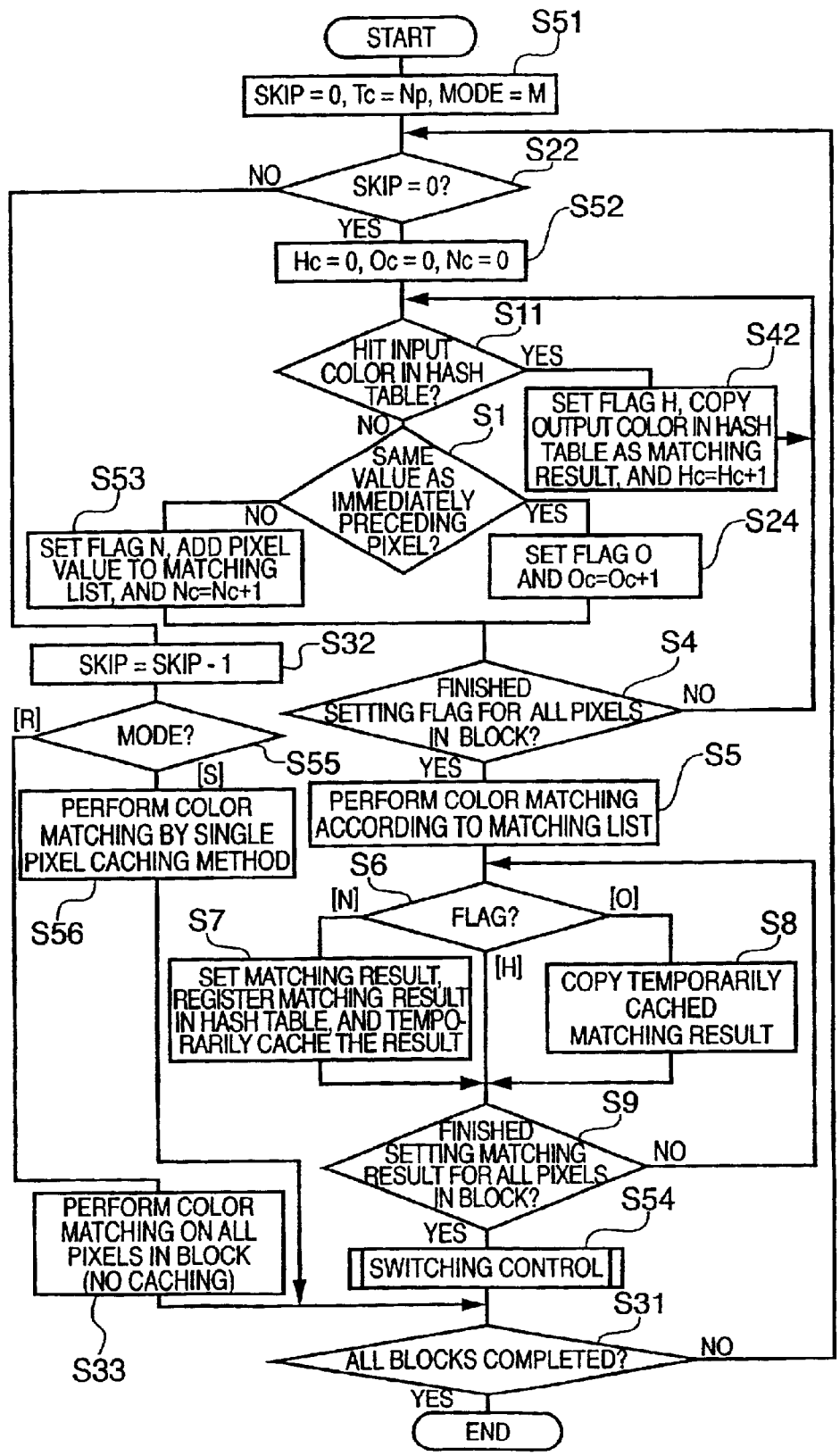
FIG. 10 is a flowchart explaining the control of switching among the plural pixel caching method, single pixel caching method, and no caching.

FIG. 10 is a flowchart explaining the control of switching among the three methods. In this case, color matching processing according to the plural pixel caching method is performed at a checkpoint block. Note in FIG. 10, steps performing the same processing as that of FIG. 3, 4, 8 or 9 are described with the same reference numerals, and detailed description thereof is omitted.

When color matching processing starts, at step S51, the variable SKIP is cleared to 0, the number of pixels Np in the block (1024 in this case) is set to the variable Tc, and a variable MODE indicative of a caching method is set to M.

When SKIP=0, color matching processing is performed by the plural pixel caching method. This processing is mostly the same as that explained in FIG. 4, except that the variables Hc, Oc, and Nc are cleared to 0 (S52), the variable Hc is incremented when a hit is found in the hash table (S42), the variable Nc is incremented when flag N is set (S53), and the variable Oc is incremented when flag O is set (S24). In other words, the variable Hc represents the number of hits in the hash table, Oc represents the number of hits in the cache, and Nc represents the number of pixels which did not find hits.

When a matching result is set to all pixels in the block, switching control is performed based on the variables Hc, Oc and Nc at step S54. Note that the sum of Hc, Oc and Nc equals Tc.

Figure 11:
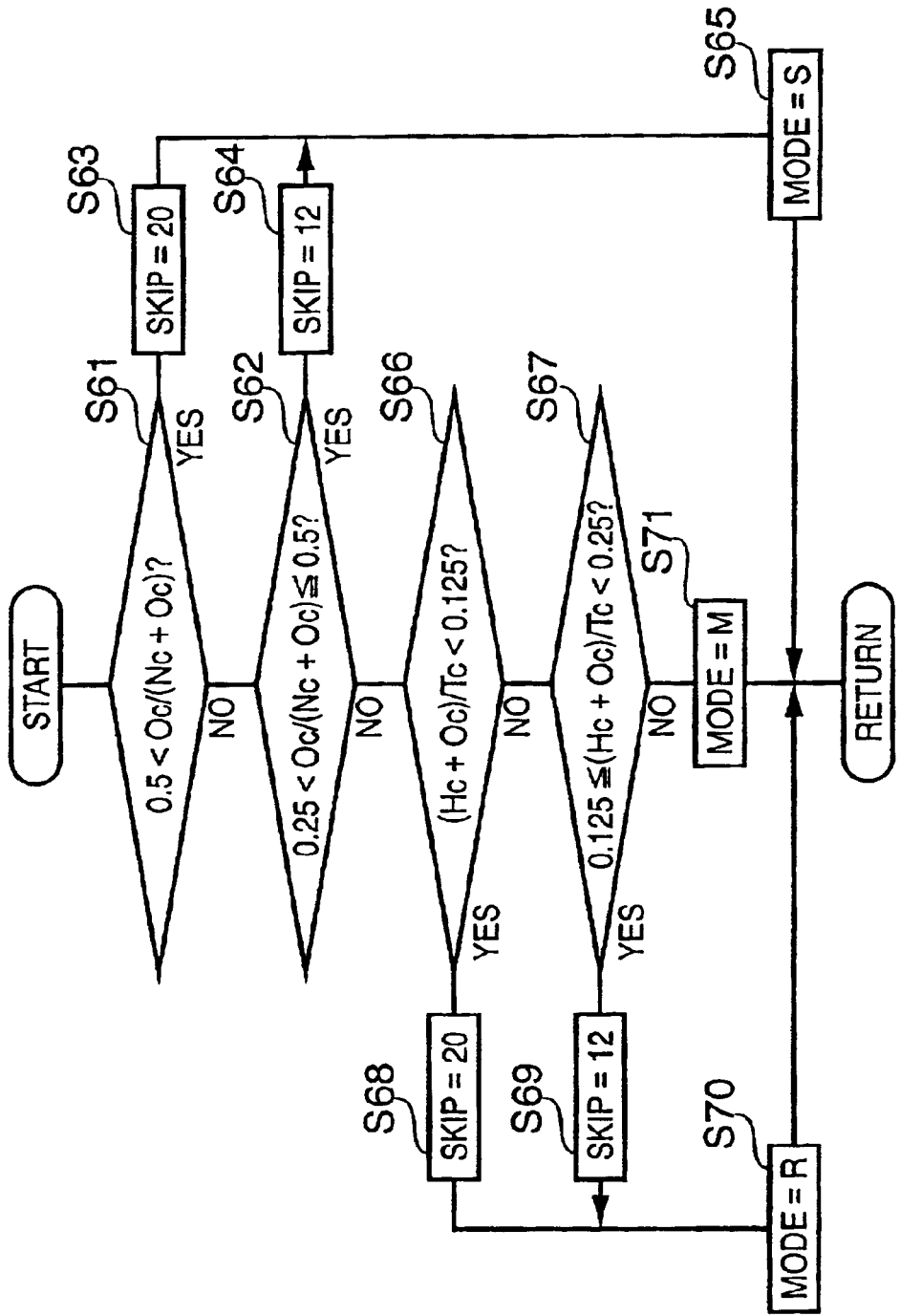
FIG. 11 is a flowchart explaining the switching control in detail.

FIG. 11 is a flowchart explaining the switching control in detail.

A hit rate per unit block is obtained by (Hc/Oc)/Tc. With respect to a pixel value unregistered in the hash table, a hit rate in the single pixel caching method is obtained by Oc/(Nc+Oc). Therefore, a small value of (Hc+Oc)/Tc indicates a low hit rate of the plural pixel caching method, while a large value of Oc/(Nc+Oc) indicates a high hit rate of the single pixel caching method. In other words, color matching processing speed for an image of interest can be optimized by controlling the most appropriate caching method and the number of blocks to be skipped (or performing processing by single pixel caching method) based on the two hit rates.

At steps S61 and S62, the hit rate Oc/(Nc+Oc) is evaluated. When 0.5<Oc/(Nc+Oc) stands, SKIP=20 (S63) and MODE=S (S65) are set. When 0.25<Oc/(Nc+Oc)≦0.5 stands, SKIP=12 (S64) and MODE=S (S65) are set. When MODE=S is set, the number of blocks specified by SKIP is subjected to color matching processing by the single pixel caching method (S55 and S56).

Furthermore, when Oc/(Nc+Oc)≦0.25 stands, the hit rate (Hc+Oc)/Tc is evaluated at steps S66 and S67. When (Hc+Oc)/Tc<0.125 stands, SKIP=20 (S68) and MODE=R (S70) are set. When 0.125≦(Hc+Oc)/Tc<0.25 stands, SKIP=12 (S69) and MODE=R (S70) are set. When MODE=R is set, the number of blocks specified by SKIP is subjected to color matching processing with no caching (S55 and S33).

Furthermore, when Oc/(Nc+Oc) is less than 0.5 and (Hc+Oc)/Tc is equal to or larger than 0.25, color matching processing is performed by the plural pixel caching method; thus MODE=M (S71) is set.

Similar to the processing shown in FIGS. 8 and 9, the aforementioned configurations and parameters for cache switching control, e.g., the threshold values shown in steps S61 to S69, the number of skips (processing), and the level of skip numbers (processing) and so forth, are an example, and vary depending upon the capability of color matching processing.

According to the above-described first and second embodiments, the following effects are attained:

(1) Since a caching method applied to a subsequent block is switched and controlled based on a hit rate in a cache or a hash table, obtained per unit block subjected to color matching, a color caching method appropriate for an image can be selected and color matching processing speed can be improved.

(2) It is possible to control the number of blocks subjected to processing by a color caching method selected based on the aforementioned hit rate. In other words, it is possible to control the application area of the color caching method selected in accordance with the hit rate.

<Modification of Embodiments>

The cache switching control parameters utilized in the above embodiments can be dynamically set based on a result of an input image analysis.

The color cache described in the foregoing embodiments is advantageous since the number of processing can be reduced for image data described in bitmap data. However, the color cache is not necessary for rendering data designating one color. Therefore, first of all, it is determined whether or not input data is in the image data format (bitmap). When the input data is not in the image data format, caching is not performed for the object represented by the input data.

Meanwhile, when the input data is in the image data format, the input data is analyzed to optimize the cache switching control parameters. More specifically, the input data is determined by analyzing the characteristics of an image of interest (rasterized image where plural images are pasted, photograph image, CG and so on), and/or the size of the image of interest.

For instance, if the input data is determined to be a rasterized image where plural images are pasted, each of the plural images may have different characteristics. Therefore, the number of skips is set small so as to appropriately switch the caching method for the complicated rasterized image where various images are pasted. On the other hand, if the input data is determined to be a CG image, the number of skips is set large so as to reduce the number of determination for switching the caching method.

As set forth above, the processing efficiency can be improved by analyzing input data and controlling cache switch based on an analysis result.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. An image processing apparatus, comprising:
   a calculator arranged to calculate an output color corresponding to an input color;
   a cache memory arranged to cache a calculation result of said calculator in order to uniquely determine an output color corresponding to an input color;
   a converter arranged to convert an input color to an output color in predetermined processing unit, by utilizing said calculator and said cache; and
   a controller arranged to control a caching method to be applied to a subsequent processing unit based on a cache hit rate per said processing unit.

2. The apparatus according to claim 1, wherein said controller controls an application area of the caching method based on the cache hit rate.

3. The apparatus according to claim 1, wherein the caching method comprises a method of caching a value of one pixel for referring to the value of an immediately preceding pixel, and a method of no caching.

4. The apparatus according to claim 1, wherein the caching method comprises a method of caching values of plural pixels for referring to the values of already-processed plural pixels, and a method of no caching.

5. The apparatus according to claim 1, wherein the caching method comprises a method of caching a value of one pixel for referring to the value of an immediately preceding pixel, a method of caching values of plural pixels for referring to the values of already-processed plural pixels, and a method of no caching.

6. The apparatus according to claim 1, wherein said apparatus performs color matching processing on an image.

7. A control method of an image processing apparatus having a calculator arranged to calculate an output color corresponding to an input color, a cache memory arranged to cache a calculation result of the calculator in order to uniquely determine an output color corresponding to an input color, and a converter arranged to convert an input color to an output color in predetermined processing unit, by utilizing the calculator and the cache, comprising the step of controlling a caching method to be applied to a subsequent processing unit based on a cache hit rate per said processing unit.

8. The method according to claim 7, further comprising the step of controlling an application area of the caching method based on the cache hit rate.

9. The method according to claim 7, wherein the caching method comprises a method of caching a value of one pixel for referring to the value of an immediately preceding pixel, and a method of no caching.

10. The method according to claim 7, wherein the caching method comprises a method of caching values of plural pixels for referring to the values of already-processed plural pixels, and a method of no caching.

11. The method according to claim 7, wherein the caching method comprises a method of caching a value of one pixel for referring to the value of an immediately preceding pixel, a method of caching values of plural pixels for referring to the values of already-processed plural pixels, and a method of no caching.

12. The method according to claim 7, wherein said apparatus performs color matching processing on an image.

13. An image processing method comprising the steps of:

converting an input color to an output color in predetermined processing unit by calculating an output color corresponding to an input color and utilizing caching arranged to uniquely determine an output color corresponding to an input color; and controlling a caching method to be applied to a subsequent processing unit based on a cache hit rate per said processing unit.

14. The method according to claim 13, further comprising the step of controlling an application area of the caching method based on the cache hit rate.

15. The method according to claim 13, wherein the caching method comprises a method of caching a value of one pixel for referring to the value of an immediately preceding pixel, and a method of no caching.

16. The method according to claim 13, wherein the caching method comprises a method of caching values of plural pixels for referring to the values of already-processed plural pixels, and a method of no caching.

17. The method according to claim 13, wherein the caching method comprises a method of caching a value of one pixel for referring to the value of an immediately preceding pixel, a method of caching values of plural pixels for referring to the values of already-processed plural pixels, and a method of no caching.

18. A computer program product comprising a computer readable medium storing a computer program code, for a control method of an image processing apparatus having a calculator arranged to calculate an output color corresponding to an input color, a cache memory arranged to cache a calculation result of the calculator in order to uniquely determine an output color corresponding to an input color, and a converter arranged to convert an input color to an output color in predetermined processing unit, by utilizing the calculator and the cache, comprising a process procedure code for controlling a caching method to be applied to a subsequent processing unit based on a cache hit rate per said processing unit.

19. A computer program product comprising a computer readable medium storing a computer program code, for an image processing method, comprising process procedure codes for converting an input color to an output color in predetermined processing unit by calculating an output color corresponding to an input color and utilizing caching arranged to uniquely determine an output color corresponding to an input color; and controlling a caching method to be applied to a subsequent processing unit based on a cache hit rate per said processing unit.

* * * * *